United States Patent [19]
Harben, Jr.

[11] 3,918,123
[45] Nov. 11, 1975

[54] APPARATUS FOR STUNNING FOWL
[75] Inventor: Grover S. Harben, Jr., Gainesville, Ga.
[73] Assignee: Gainesville Machine Company, Inc., Gainesville, Ga.
[22] Filed: July 16, 1973
[21] Appl. No.: 379,204

[52] U.S. Cl. .................. 17/11; 17/1 E; 17/45
[51] Int. Cl.² ................. A22C 21/00; A22B 3/08
[58] Field of Search ........... 17/1 E, 11, 1 R, 12, 24, 17/44, 44.1, 44.2, 45, 47; 43/98

[56] References Cited
UNITED STATES PATENTS

| | | | |
|---|---|---|---|
| 2,335,993 | 12/1943 | Bland et al. | 17/11 |
| 2,879,539 | 3/1959 | Cervin | 17/11 R |
| 3,258,811 | 7/1966 | Braun | 17/1 E |
| 3,474,490 | 10/1969 | Groover et al. | 17/11 |
| 3,555,594 | 1/1971 | Groover et al. | 17/11 X |
| 3,689,958 | 9/1972 | Dillon | 17/11 |
| 3,702,017 | 11/1972 | Lewis | 17/11 |

Primary Examiner—Anton O. Oechsle
Assistant Examiner—Arnold W. Kramer
Attorney, Agent, or Firm—Newton, Hopkins & Ormsby

[57] ABSTRACT

The method and apparatus of stunning poultry prior to processing thereof which includes separate wetting and stunning stations. In the wetting station the heads of poultry are spray soaked with saline solution and saline solution is also sprayed onto the shackles suspending the poultry so as to achieve good electrical continuity between the shackles and the feet of the poultry. After passing through the wetting station, the poultry are stunned by completing an electrical circuit between the shackle and the head of the poultry.

3 Claims, 3 Drawing Figures

APPARATUS FOR STUNNING FOWL

BACKGROUND OF THE INVENTION

This invention relates to a poultry stunning apparatus and method and is more particularly concerned with an apparatus and method for passing sufficient electrical current through the body of a fowl to stun and immobilize it prior to the time that it is killed.

The utilization of electrical current in order to stun and immobilize the poultry during processing is not new. Certain problems, however, are attendant upon such systems and these problems in turn are associated with the fact that the application of electricl stunning potential to poultry causes involuntary muscular contractions. Thus, in systems in which the head of the poultry is immersed in a body of electrolyte liquid when the stunning potential is applied almost inevitably will cause the poultry to inhale some of the liquid electrolyte and this is undesirable. Even if the poultry is so treated in the stunning process that a reduced tendency for inhalation of the liquid electrolyte is effected, the involuntary muscular contractions may easily cause damage to the bird which lessens its quality.

Moreover, it has been found that the electrical stunning potential is effective to stun and immobilize the bird in direct relation to the degree to which the electrical current passes through the brain of the poultry.

BRIEF SUMMARY OF THE INVENTION

It is, accordingly, the principal concern in connection with the present invention to provide an improved system and method for electrically stunning and immobilizing poultry prior to processing. Essentially, the concepts of the present invention are carried out by effecting the wetting of the poultry and the stunning thereof in separate stages, the wetting operation being such as to preclude wetting or soaking of the body of the bird with electrolyte but to assure that the stunning current will pass through the brain of the bird and to eliminate or materially reduce the possibility that the electrical current will bypass the brain of the poultry. To render the system more efficient, the electrical resistance between the poultry and the shackle which suspends the poultry head down is reduced by localized application of electrolyte in this region.

The stunning current is applied downstream or separate from the electrolyte wetting action and includes an arrangement wherein it is assured that the stunning current preferentially passes through the head and brain of the bird.

BRIEF DESCRIPTION OF THE DRAWING FIGURES

DETAILED DESCRIPTION OF THE INVENTION

Figure 1:
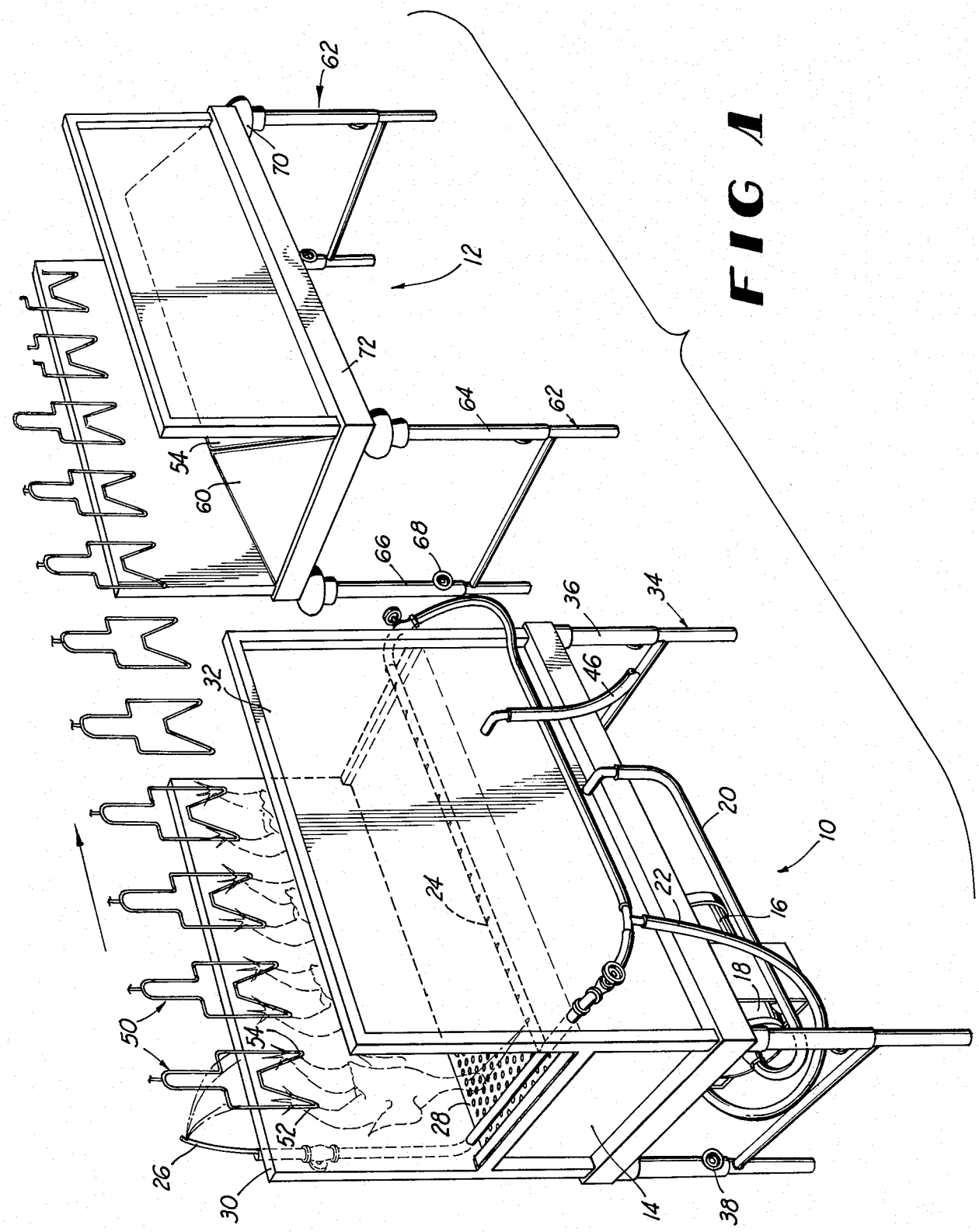
FIG. 1 is a perspective view of the illustrative embodiment of the invention.

Referring now more particularly to FIG. 1, an electrolyte applicating section of the system is indicated generally by the reference character 10 whereas the stunning section of the system is indicated generally by the reference character 12. The wetting means comprises a tank 14 containing a supply of electrolyte such as a saline solution of sodium chloride in water, a motor 16 being provided driving a recirculating pump 18 having an inlet line 20 connected to the interior of the tank 14 and having an outlet line 22 discharging to the manifold 24 and to a spray head 26, the purposes of which will be described more particularly hereinafter.

A perforate drain top 28 is provided at the top of the tank 14 and high rising opposite side walls 30 and 32 are provided along the opposite sides of the tank 14. The tank itself is supported on a legged base framework 34 and is provided with down tubes 36 telescopically engaging the upright leg portions of the frame 34 so as to be vertically adjustable with respect to the floor which supports the assembly.

Figure 2:
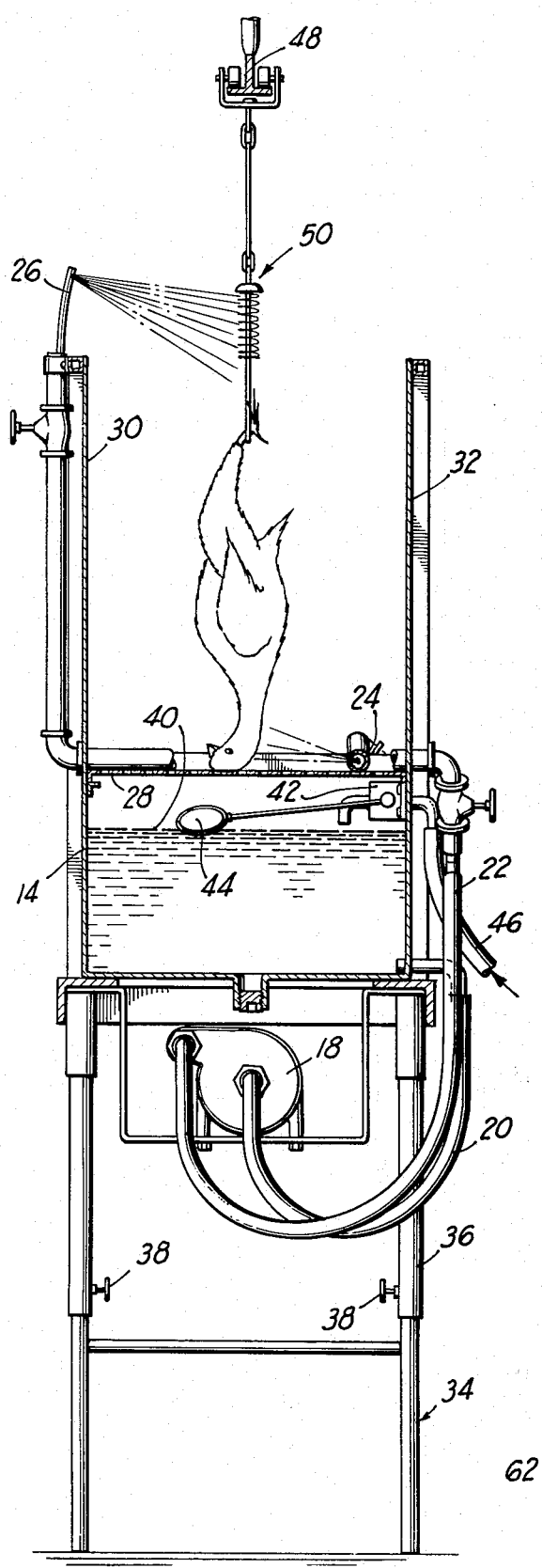
FIG. 2 is a view taken in cross section illustrating the wetting operation.

Adjusting means 38 may be provided as are illustrated in FIG. 2. FIG. 2 also illustrates the supply 40 of the electrolyte or saline solution and illustrates the fact that a simple valve 42 actuated by the float 44 controlling the supply of electrolyte from the inlet 46 is adequate to establish a sufficient level of electrolyte 40 within the tank 14.

The overhead track 48 forming part of the conveying means supports in any conventional fashion a series of shackles 50 each having a pair of crotch pieces 52, 54 as is illustrated in FIG. 1 to engage the legs of the poultry so that they are suspended head down along the poultry line. As is shown in FIG. 2, the wetting means is adjusted in height such that the spray from the manifold 24 drenches the heads of the poultry as they pass slowly through the wetting means and, simultaneously, the spray head at the entry end of the wetting means applies a spray of saline solution to the shackles 50 so that the saline solution runs down onto the crotch pieces 52 and 54 and establishes good electrical continuity between the shackles and the legs of the poultry. The poultry will hold their breath while being drenched from the manifold 24 and will not inhale any of the saline solution.

Figure 3:
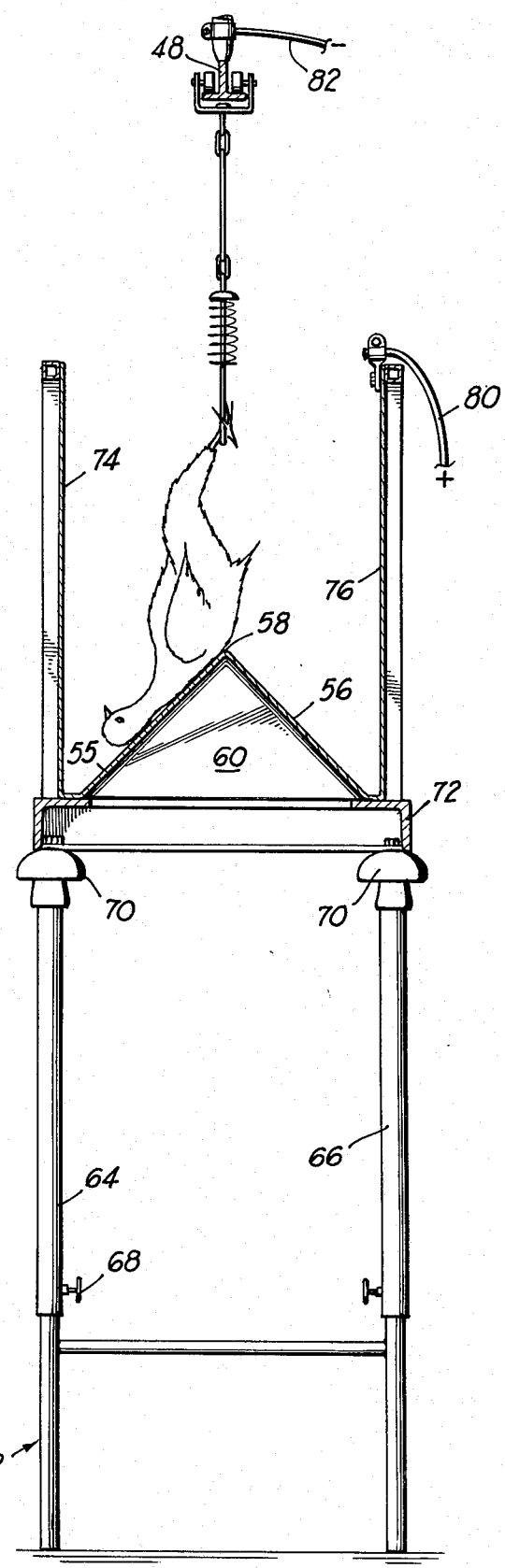
FIG. 3 is a view taken in cross section through the stunning section of the system.

After passing from the wetting means 10, the suspended poultry will pass through the stunning means 12. The stunning means includes a poultry-engaging electrical contact means in the form of an inverted V-shaped member presenting the opposite, sloped side walls 55 and 56 as is shown in FIG. 3 the apex 58 of which is aligned substantially directly below the track 48 of the poultry line. At the inlet end, the contacting means has a triangular contact plate portion 60 which is sloped upwardly in the direction of travel of the poultry. The stunning means as can be seen in FIG. 3 includes a base stand 62 similar to the stand 34 of the wetting means and an intermediate frame section includes the down tubes 64, 66 which are adjustably engaged through the means 68 with the leg portions of the base 62 so as to vertically position the stunning means at the desired and proper height. At the upper ends of the down tubes 64 and 66 insulator devices 70 are provided which electrically insulate the frame portion 72 from ground. Upstanding side walls 74 and 76 provide more or less of a protective enclosure on either side of the contacting means and the outer sides of these uprights and of the frame portion 72 preferably are provided with electrical insulation to prevent inadvertent electrical contact with the device. The electrically conductive portion of the stunning device is connected through a suitable connector 80 to one side of a source of electrical potential whereas the connector 82 connects the rail 48 to the other side of such electrical potential source. As has been stated previously, the spray head 26 drenches the shackles above the crotch pieces 52 and 54 and allows electrolyte to run down onto the legs of the poultry whereas the heads only of the poultry are drenched by the manifold 24. As a result, when the poultry, suspended head down, progress into the stunning means 12, the drenched heads of the poultry will contact one or the other of the side walls 55 or 56 and or the entrance plate 60 as the case may be and the wetted, electrolyte-drenched heads of the poultry will, in conjuction with the wetted feet or legs thereof form an excellent electrical path through the brain of the bird across the two sides of the electrical potential source.

It has been found that the application of the electrolyte by means of the spray head 26 to increase the electrical conductivity between the poultry and the shackles 50 allows approximately 25% reduction in the voltage utilized effectively to stun and immobilize the poultry. Confining the drenching of the bird only in the head region thereof by the manifold 24 also materially enhances the stunning effect because no extraneous path bypassing the brain of the poultry can be effected even if the side walls 54 and 56 are adjusted so high as to enable portions above the head and neck of the poultry to engage thereagainst. However, the adjustment of the contacting means should be about as is shown in FIG. 3 so that the neck and the major portion of the bird's body above such contacting means is not capable of striking any part of the stunning means as would otherwise be possible due to involuntary muscular contractions of the bird during the stunning operation and which might cause damage to the poultry.

What is claimed is:

1. A poultry stunning system comprising, in combination:

shackle conveyor means engaging the feet of successive poultry for travelling the poultry head down along a poultry line path;

wetting means disposed along said path for wetting the heads of successive poultry at a discrete region along said path and for wetting said shackle means whereby to enhance electrical continuity between such conveyor shackle means and the feet of poultry engaged thereby;

electrical contact means disposed along another discrete region of said path downstream and electrically insulated from said wetting means for engaging the heads of poultry as they move along said another discrete region of the path; and electrical current stunning means electrically connected to said electrical contact means and said conveyor shackle means for stunning poultry when their wetted heads engage said electrical contact means.

2. A poultry stunning system comprising, in combination:

a succession of shackles adapted to suspend a succession of poultry by their feet;

means for moving said shackles along a selected poultry line path;

first means along said path for wetting the shackles and feet of the poultry and for separately wetting the heads of the poultry; and second means located downstream in the poultry line from said first means and electrically insulated therefrom for successively coupling said shackles and the wetted heads of poultry suspended therefrom across a source of electric current.

3. A poultry stunning system as defined in claim 2 wherein said second means includes an electrical contact in the form of an inverted V-shaped member having its apex aligned with and along the poultry line path upon which the wetted heads of poultry may engage.

* * * * *